Aug. 9, 1932.  K. SCHOENE  1,870,927
VALVE ESPECIALLY FOR PUMPS AND COMPRESSORS
Filed Aug. 20, 1930

Inventor
Kurt Schoene
By Dodge and Ins.
Attorneys

Patented Aug. 9, 1932

1,870,927

UNITED STATES PATENT OFFICE

KURT SCHOENE, OF HAMBURG, GERMANY

VALVE ESPECIALLY FOR PUMPS AND COMPRESSORS

Application filed August 20, 1930, Serial No. 476,657, and in Germany September 17, 1929.

Valves for pumps and compressors having conical packing faces have hitherto been carried out so that the packing faces are the one opposite to the other obliquely to the direction of flow when the valve is open.

This invention has for its object to obviate the inconveniences of such valves which will be hereinafter explained.

In the accompanying drawing—

Figure 1:
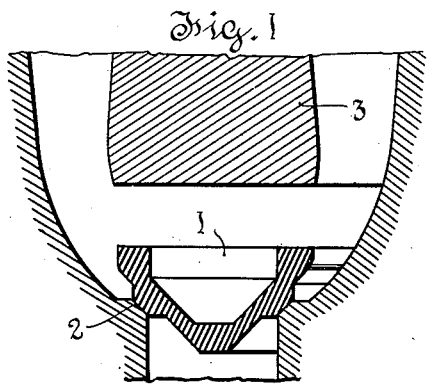
Fig. 1 shows in vertical section an annular valve of known type.
Figure 2:
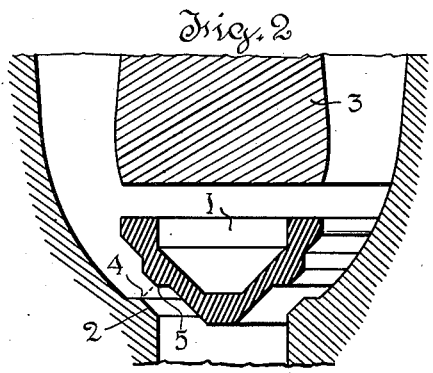
Fig. 2 shows the valve of Figure 1 in partly opened position.
Figure 3:
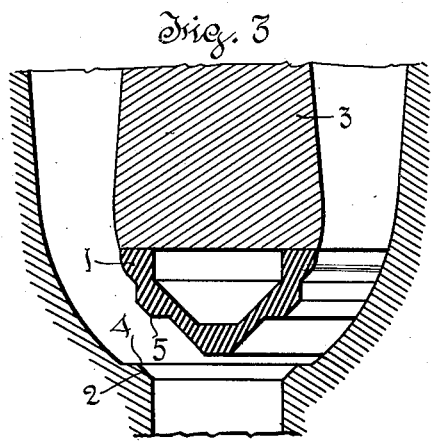
Fig. 3 is a similar view as Figs. 1 and 2 showing the valve in completely opened position.

The commonly used annular valve with discharge nozzles, shown in Figs. 1, 2, and 3 comprises an annular valve body 1, a valve seat 2 and a ring element 3 for the formation of the discharge nozzles and serving at the same time for limiting the stroke of the valve body.

In the position of the commonly used valve shown in Fig. 2 the outer edge 4 of the packing face on the valve seat is perpendicular to the direction of the flow relative to the inner edge 5 of the packing face of the annular valve body. If the valve stroke is equal to or shorter than in the position shown in Fig. 2 the narrowing passage cross section in the valve gap is determined by the distance between the packing faces perpendicularly to the direction of flow. As soon as the annular valve body rises to above the position shown in Fig. 2, the passage cross section is suddenly enlarged by the height of the packing face projection on the annular valve body, as there are no longer any portions of the packing faces the one opposite the other perpendicularly to the direction of flow. Sudden alterations of velocity, pressure and direction are thereby produced in the liquid jet flowing through, wherefrom result oscillations of the annular valve body, which are prejudicial to the steady movement of the valve as well as for the efficiency of the nozzles and lead to losses of energy. These defects occur in specially high degree in valves with discharge nozzles, on which the annular valve body is very lightly held and guided free from friction and in which the velocity of the flowing liquid is high.

According to the invention these defects are avoided, as the packing faces are constructed so that portions of the same are standing the one opposite to the other perpendicularly to the direction of flow even when the valve is open. The packing faces can, with this object in view, be enlarged so much that the portions, standing the one opposite the other perpendicularly to the direction of flow, are of the same width as the packing faces, so that the front and rear edges of the packing faces on the valve body and on the valve seat are also standing the one opposite the other perpendicularly to the through flow passage.

Figure 4:
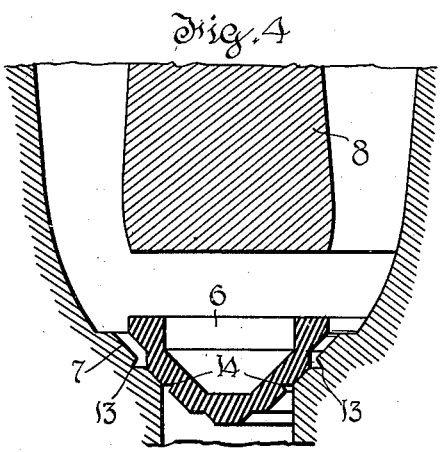
Figs. 4, 5 and 6 show each in vertical section a valve improved according to the invention, in Fig. 4 in closed position, in Fig. 5 in partly opened position and in Fig. 6 in completely opened position.
Figure 5:
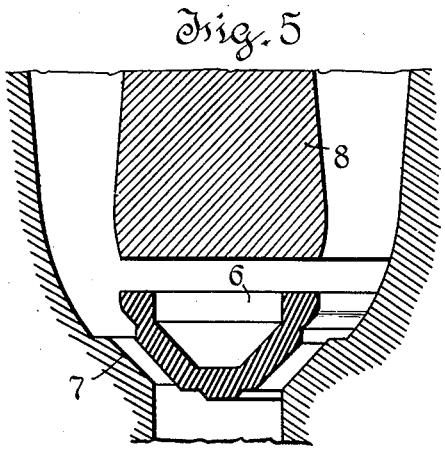
Figure 6:
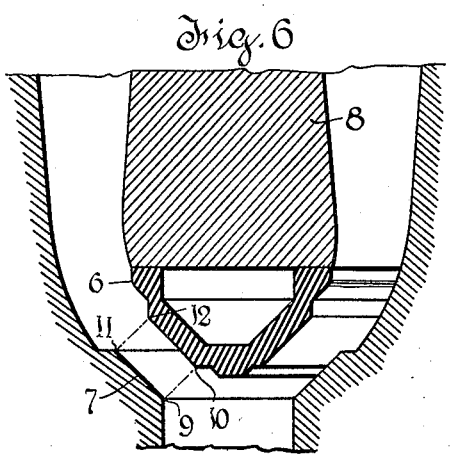

In Figs. 4, 5 and 6 the annular valve body is designated by 6, the valve seat by 7 and the ring element for the formation of the discharge nozzles by 8. In the forms of construction shown, the packing faces on the valve seat and on the valve body are enlarged so that the inner edges 9 and 10 and the outer edges 11 and 12, and therefore the packing faces, are opposite the one to the other in full width perpendicular to the direction of flow, when the valve is completely open as shown in Fig. 6. The passage cross section is therefore, as shown in Fig. 5, gradually and not suddenly altered at the rising and lifting of the valve body, and no unnecessary deflecting of the liquid jet takes place.

The enlarging of the packing faces ensures the further advantage, that the velocity of flow of the water underneath the annular valve body is increased on a considerable ring width. The pressure of the liquid upon the lower side of the valve and the force, which has to be exerted by the valve springs upon the annular valve body, are consequently decreased. At the high velocities usual in the nozzles valve this decrease of the necessary spring pressure is very important.

If the portions of the packing faces, standing the one opposite the other perpendicularly to the direction of flow, are narrower than the width of the packing faces, the advantageous effects according to the invention do still occur but not in such high degree as otherwise. In such a form of construction the packing faces are enlarged only on the valve disc or annular body or on the seat.

In order to prevent undesired formation of burrs when wear occurs on the packing faces, the packing faces proper can be separated, as shown in Fig. 4, from the enlarging faces by grooves 13 and 14.

I claim:—

1. A valve for pumps or compressors comprising in combination a body having a conical valve seat and a coacting valve having a conical seating surface which mates with said seat when the valve is closed, said seat and seating surface defining in the open positions of the valve a passage through which flow substantially parallel with said surfaces occurs, said seat and seating surface being so dimensioned one relatively to the other that the edges of the seat and the edges of the seating surface are opposed to each other in a direction substantially perpendicular to the direction of flow through the valve when the valve is in its limiting open position.

2. The combination of claim 1, further characterized in that said seat and seating surface each comprise a mating surface and an extension thereof substantially alined therewith and separated therefrom by an annular groove.

In testimony whereof I affix my signature.

KURT SCHOENE.